May 26, 1925.  
L. E. SHAW  
DECOY DUCK  
Filed Sept. 14, 1922  
1,539,436
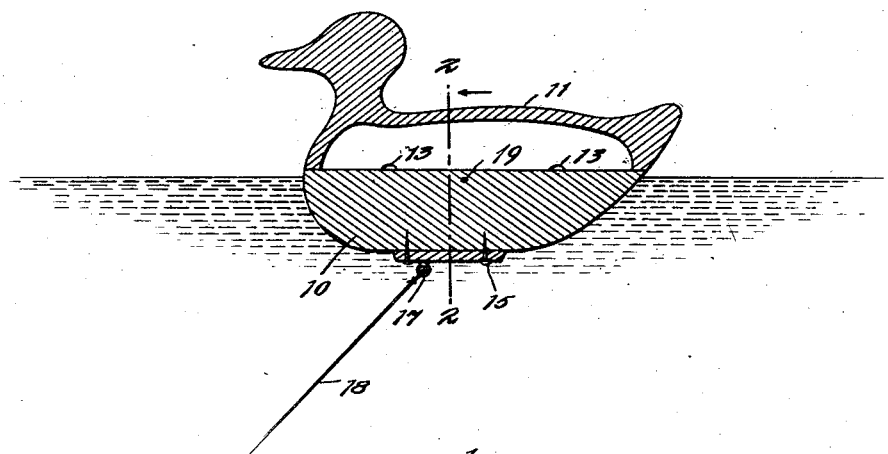
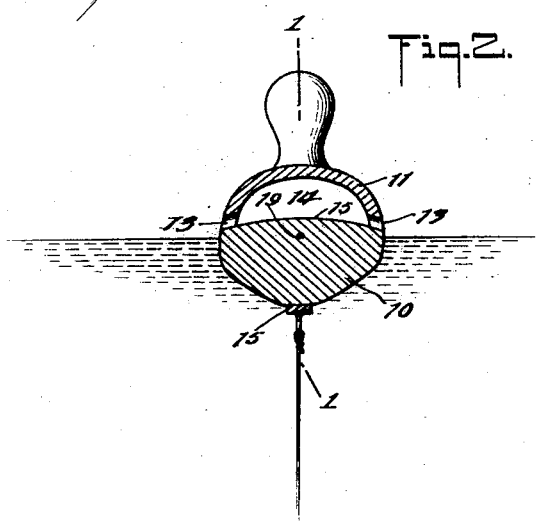
Inventor  
Louis E. Shaw  
By Warren S. Orton  
Attorney Patented May 26, 1925.

1,539,436

UNITED STATES PATENT OFFICE.

LOUIS E. SHAW, OF EAST ORANGE, NEW JERSEY.

DECOY DUCK.

Application filed September 14, 1922. Serial No. 588,277.

*To all whom it may concern:*

Be it known that I, LOUIS E. SHAW, a citizen of the United States, and resident of East Orange, in the county of Essex and State of New Jersey, have invented certain new and useful Improvements in Decoy Ducks, of which the following is a specification.

The invention relates to a floating decoy duck of the type usually used by sportsmen to attract the natural ducks.

Such decoy ducks now in general use are usually made of wood which frequently splits when subjected to severe climatic conditions; are difficult to construct and when accidentally tipped over out of their normal floating position in the water remain on their sides until righted. Further such known forms of decoy ducks are practically useless when their painted surface is chipped off for the wooden portion exposed, by a stray shot for instance, presents a bare shiny surface which frightens away the natural ducks.

The primary object of the invention is to provide an inexpensive, easily manufactured decoy duck which will tend to maintain its floating position when once launched; which will be light in weight thus providing for easy porting; which will not split even if damaged, and which will tend to maintain its non-glare surface even should part of the outline be shot away.

The invention features a molded structure which can be readily formed with suitable dies to give the desired configuration and preferably the article is formed of a cork composition which has the advantage of being readily moldable under pressure and at the same time provides a decoy which will be light in weight and which can be readily decorated as is usual with such articles.

Various other objects and advantages of the invention will be in part obvious from an inspection of the accompanying drawings and in part will be more fully set forth in the following particular description of one form of mechanism embodying my invention, and the invention also consists in certain new and novel features of construction and combination of parts hereinafter set forth and claimed.

In the accompanying drawing:—

Figure 1 is a vertical sectional view taken longitudinally through a preferred embodiment of the invention and taken on the line 1—1 of Figure 2; and Figure 2 is a transverse sectional view taken on the line 2—2 of Figure 1.

In the following description and in the claims, parts will be identified by specific names for convenience of expression but they are intended to be as generic in their application to similar parts as the art will permit.

The decoy illustrated is formed largely of two molded parts coacting to simulate in outline the form of a natural duck. The parts include a solid floatation member 10 on which is positioned a hollow super-structure 11 secured to the top of the floatation member by some suitable fastening means such as glue. The super-structure is provided with drain vents 13 for draining the interior space 14 of the super-structure in case water should leak into this part of the decoy. To facilitate the draining of this space the upper side of the floatation member is curved transversely as shown in 15 towards the vents 13 on opposite sides of the decoy.

In order to maintain the decoy in upright position a keel weight 15 is secured by some suitable means such as by nails to the underside of the floatation member and this weight is provided with an eye 17 to which is secured an anchor cable 18.

The parts are so designed, apportioned and weighted that the center of mass of the decoy considered as a whole is positioned adjacent and below the center of floatation and both of these centers are positioned within the outline of the floatation member adjacent the top 15 and approximately at the point 19.

In forming the decoy it will be understood that the floatation member and the super-structure are formed separately in suitable molds using a cork composition which can be readily molded under pressure and after being removed from the mold cured to a set form. The parts are fastened together with the keel plate secured in position and, when suitably decorated, the decoy is ready to be marketed. The decoy is disposed in position on the water and due to the peculiar locating of its center of floatation it will automatically assume the natural floating position of the live ducks and will maintain this position even in rough water under forces which would normally tend to upset it.

The cork composition has the advantage of non-splintering and non-splitting and even if parts be shot away the new surface of the cork thus exposed will be of a dull non-glare character. The cork composition may be formed of a neutral color throughout so that even if parts of the painted surface are shot away the surface thus exposed will be of the same color as the original surface and the natural duck will not be affected by an mutilation of the decoy.

Having thus described my invention, I claim:

1. A decoy duck formed of a cork composition simulating in outline a natural duck, including a solid floatation member and a hollow super-structure secured thereto, said decoy duck having its center of mass and its center of floatation adjacent each other and both located within the outlines of the floatation member and adjacent the top of the floatation member.

2. A decoy luck including a floatation member, a molded superstructure secured thereto and simulating in outline the upper portion of a duck, said superstructure being formed of a cork composition and presenting on its exposed outerside a non-glare surface.

3. A decoy duck formed of a cork composition and presenting a non-glare surface when its outline surface is chipped.

Signed at New York city in the county of New York and State of New York this 1st day of September A. D 1922.

LOUIS E. SHAW.

Witness:
SARA A. THORNTON.